United States Patent
Strandjord et al.

(10) Patent No.: US 9,459,101 B1
(45) Date of Patent: Oct. 4, 2016

(54) SYSTEMS AND METHODS FOR FIBER OPTIC GYROSCOPES UTILIZING REFERENCE RING RESONATORS

(71) Applicant: Honeywell International Inc., Morristown, NJ (US)

(72) Inventors: Lee K. Strandjord, Tonka Bay, MN (US); Glen A. Sanders, Scottsdale, AZ (US); Tiequn Qiu, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/739,393

(22) Filed: Jun. 15, 2015

(51) Int. Cl.
 *G01C 19/72* (2006.01)
(52) U.S. Cl.
 CPC .................... *G01C 19/727* (2013.01)
(58) Field of Classification Search
 CPC .... G01C 19/727; G01C 19/72; G01C 19/66; G01C 19/64; H01S 5/1071
 USPC ......................................................... 356/461
 See application file for complete search history.

(56) References Cited

U.S. PATENT DOCUMENTS

| | | | | |
|---|---|---|---|---|
| 4,923,299 A * | 5/1990 | Anderson | ............ | G01C 19/727 356/470 |
| 5,274,659 A * | 12/1993 | Harvey | ............... | H01S 3/06791 372/18 |
| 8,009,296 B2 | 8/2011 | Sanders et al. | | |
| 8,446,590 B2 | 5/2013 | Sanders et al. | | |
| 8,514,400 B2 * | 8/2013 | Mohageg | ............... | G01C 19/72 356/459 |
| 8,659,760 B2 * | 2/2014 | Sanders | ............... | G01C 19/727 356/461 |
| 8,873,063 B2 * | 10/2014 | Sanders | ............... | G01C 19/727 356/461 |
| 8,908,187 B2 | 12/2014 | Strandjord et al. | | |
| 2008/0137091 A1 * | 6/2008 | Sanders | ............... | G01C 19/727 356/461 |
| 2014/0240712 A1 | 8/2014 | Strandjord et al. | | |
| 2014/0369699 A1 | 12/2014 | Strandjord et al. | | |
| 2015/0369605 A1 * | 12/2015 | Strandjord | .......... | G01C 19/721 356/461 |

* cited by examiner

*Primary Examiner* — Tarifur Chowdhury
*Assistant Examiner* — Md M Rahman
(74) *Attorney, Agent, or Firm* — Fogg & Powers LLC

(57) ABSTRACT

Systems and methods for fiber optic gyroscopes are provided. In one embodiment, a resonating fiber optic gyroscope comprises: first and second laser sources producing first and second optical beams; a first resonator having a hub comprising a hub material, wherein the first and second optical beams circulate within the first resonator in opposite directions; a second resonator having a hub comprising the hub material, wherein the first and second optical beams circulate within the second resonator in opposite directions; first and second servo loops; the first loop controls the first laser source based on a beam that has circulated through the first resonator and a beam that has circulated through the second resonator; the second servo loop controls the second laser source based on a beam that has circulated through the first resonator and a beam that has circulated through the second resonator; and a rotation rate detection circuit.

20 Claims, 8 Drawing Sheets

SYSTEMS AND METHODS FOR FIBER OPTIC GYROSCOPES UTILIZING REFERENCE RING RESONATORS

BACKGROUND

The resonator fiber optic gyroscope (RFOG) is a promising contender for next generation navigation gyroscope. It has the potential to provide a navigation grade solution with the combination of low cost, small package size and weight. The RFOG uses at least two laser beams, at least one propagates around a resonator coil in the clockwise (CW) direction and the other in the counter-clockwise (CCW) direction. In the operation of a resonant fiber optic gyroscope (RFOG), it is desirable to lock the frequencies of the laser light sources to the resonance frequencies of the fiber optic ring resonator using high bandwidth electronic servos. Current baseline RFOG designs often use the gyroscope's fiber ring resonator sensing coil as a reference resonator to stabilize a master laser. Then the master laser stability is transferred to slave lasers using high speed optical phase lock loops. This results in reduced phase noise relative to the gyro resonator sensing coil, which improves gyro performance. One disadvantage of this approach is that the master laser must co-propagate with one of the slave laser beams that are used for rotation sensing. The beating between these two beams can cause rotation sensing errors. Optical filters have also been utilized to clean up phase noise on the output of slave lasers. However, a disadvantage to these approaches is that the optical filters often need to be combined with some kind of temperature control to make their operating frequencies track the resonant frequencies of the gyro resonator sensing coil. This temperature control introduces significant power dissipation and cost to the gyro.

For the reasons stated above and for other reasons stated below which will become apparent to those skilled in the art upon reading and understanding the specification, there is a need in the art for systems and methods for fiber optic gyroscopes utilizing reference ring resonators.

SUMMARY

The Embodiments of the present invention provide systems and methods for fiber optic gyroscopes utilizing reference ring resonators and will be understood by reading and studying the following specification.

In one embodiment, a resonating fiber optic gyroscope comprises: a first laser light source producing a first optical beam; a second laser light source producing a second optical beam; a first fiber optic ring resonator comprising a first length of a fiber optic material wound around a first hub comprising a hub material, wherein the first optical beam and the second optical beam circulate within the first fiber optic ring resonator in opposite directions; a second fiber optic ring resonator comprising a second length of the fiber optic material wound around a second hub comprising the hub material, wherein the first optical beam and the second optical beam circulate within the second fiber optic ring resonator in opposite directions; a first servo loop coupled to the first fiber optic ring resonator and the second fiber optic ring resonator, wherein the first servo loop controls the first laser light source as a function of a first portion of the first optical beam that has circulated through the first fiber optic ring resonator, and a second portion of the first optical beam that has circulated through the second fiber optic ring resonator; a second servo loop coupled to the first fiber optic ring resonator and the second fiber optic ring resonator, wherein the second servo loop controls the second laser light source as a function of a first portion of the second optical beam that has circulated through the first fiber optic ring resonator, and a second portion of the second optical beam that has circulated through the second fiber optic ring resonator; and a rotation rate detection circuit that outputs a rotation rate measurement as a function of a difference between a first resonant frequency of the second fiber optic ring resonator locked-on to by the first optical beam, and a second resonant frequency of the second fiber optic ring resonator locked-on to by the second optical beam.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide system and methods that utilize a second ring resonator within a resonating fiber optic gyroscope. This second ring resonator (referred to herein as the reference fiber resonator) is made of the same construction as the rotation rate sensing ring resonator (referred to herein as the gyro ring) to ensure that the operating frequency of the reference fiber resonator automatically tracks shifts in resonant frequencies that occur in the rotation rate sensing ring resonator. Furthermore, the fiber length of the referred to herein as the reference fiber resonator is chosen to have a special relationship with the gyro ring to allow sideband heterodyne detection (SHD) modulations to be applied directly to the optical beams and to be passed through the optical filter cavity and onto the gyro resonator. This eliminates the need for expensive and large optical phase modulators. Further, the implementations described here avoid the need to use temperature control to make the operating frequencies of the reference fiber resonator track the gyro ring. Because the reference fiber ring is fabricated from the same type of fiber material as the gyro resonator, and wound on an equivalent hub, the resonant frequencies of the reference fiber ring will naturally track the resonant frequencies of the gyro resonator. Instead of needing large heaters, small heaters along with a control loop may be optionally employed to address temperature gradient across the device and small differences in the optical pathlength thermal expansion coefficients of the two resonators. These small heaters would consume considerable less power that heaters that would be necessary to implement temperature controlled resonant frequency tracking of the gyro resonator.

Figure 1:
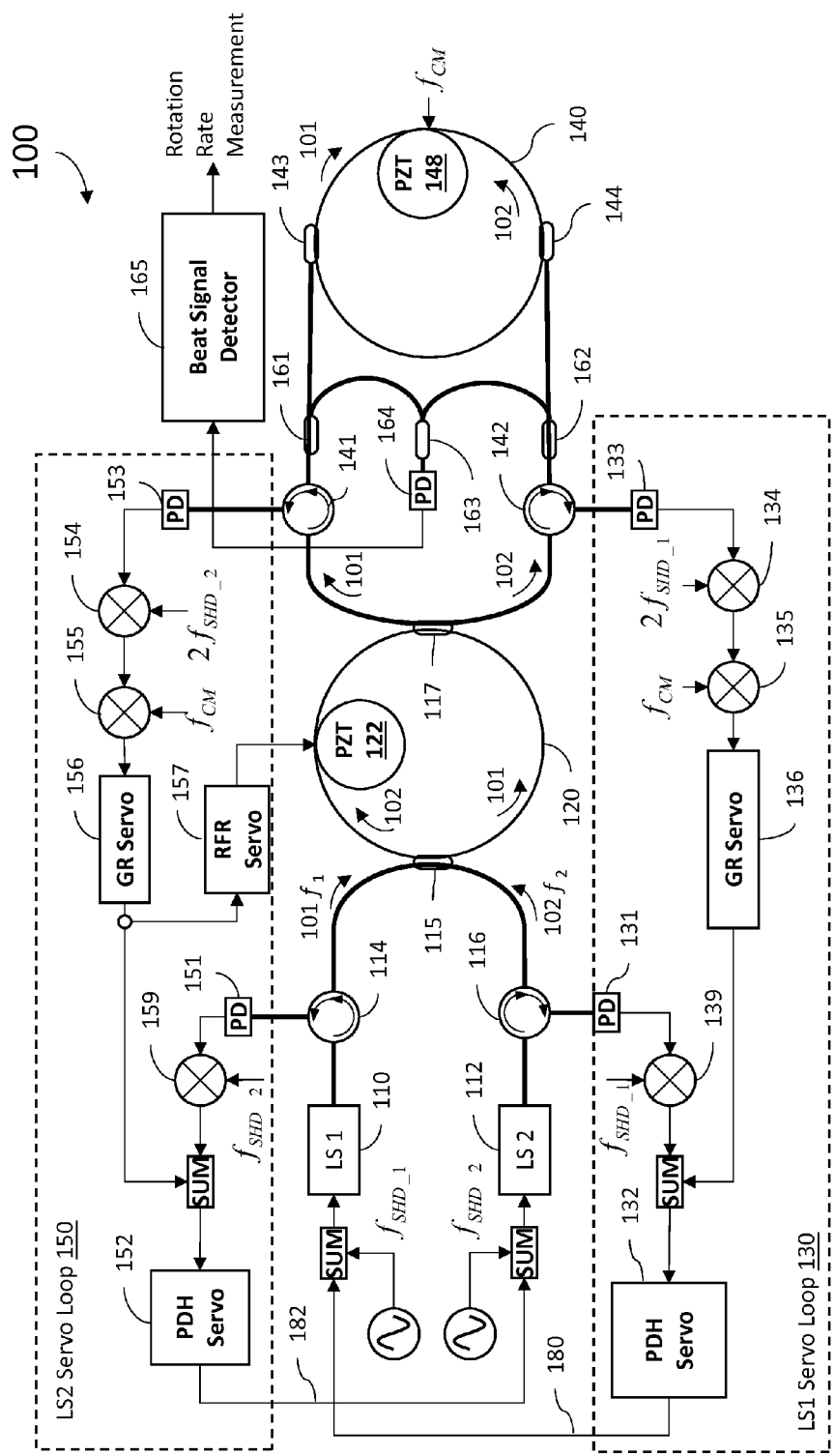
FIG. 1 is a diagram illustrating a gyroscope of one embodiment of the present disclosure.

FIG. 1 is a block diagram illustrating a resonator fiber optic gyroscope (RFOG) 100 of one embodiment of the present disclosure that includes a first fiber optic ring resonator 120 (referred to herein as the reference fiber ring 120) and a second fiber optic ring resonator 140 (referred to herein as the gyro fiber ring 140). Reference fiber ring 120 and gyro fiber ring 140 each comprise a length of fiber optic material wound around a center hub. The fiber optic material may comprise either hollow core, solid core, or dielectric filled fiber material, but both reference fiber ring 120 and gyro fiber ring 140 are constructed from the same fiber optic material, though the length of material used to fabricate each need not be the same. They are also wound around hubs comprising the same hub material. In one embodiment, reference fiber ring 120 and gyro fiber ring 140 are each wound around hub material comprising the same piezoelectric ceramic material, such as (but not limited to) lead zirconate titanate, that is configured as a piezoelectric transducer (shown respectively in FIG. 1 as PZT 122 and 148). In some embodiments, the fiber optic material may be wound around hubs made of the same composite of materials such as, but not limited to, a combination of ceramic and aluminum or other metal.

As explained further below, reference fiber ring 120 provides a reference for generating a feedback signal for controlling the frequency of light produced from laser sources 110 and 112. In some embodiment, reference fiber ring 120 also functions as an optical filter to remove noise from light beams provided to the gyro ring 140. Gyro ring 140 constitutes the rotation sensing element of gyroscope 100 where the difference in the clockwise and counter clockwise resonance frequencies is measured with counter-propagating light beams to derive a rotation rate measurement.

RFOG 100 further comprises a first laser source (LS 1) 110 and second laser source (LS 2) 112 that produce laser light beams that are coupled at least in part into the reference fiber ring 120 by at least one optical coupler 115. Laser source 110 outputs a first optical beam 101 of laser light. At least a percentage of that laser light is coupled into reference fiber ring 120 by coupler 115 and travels around reference fiber ring 120 in a first direction. Laser source 112 outputs a second optical beam 102 of laser light. At least a percentage of that laser light is also coupled into reference fiber ring 120 by coupler 115 and travels around reference fiber ring 120 in a second direction that is opposite to the first direction traveled by optical beam 101.

Just as optical coupler 115 couples optical beams 101 and 102 into reference fiber ring 120, it also couples a portion of the light propagating within reference fiber ring 120 back out. In the embodiment of FIG. 1, this light coupled out from reference fiber ring 120 is utilized to control laser sources 110 and 112.

For example, in one embodiment, the optical beam 101 after generation by laser source 110 follows a path where it is directed by a circulator 114 to coupler 115 and into reference fiber ring 120 where it circulates around the ring. There is also a portion of light 101 directed to coupler 115 that is directed by coupler 115 to circulator 116 without coupling into reference fiber ring 120. Optical beam 102 after generation by laser source 112 follows a path where it is directed through a circulator 116 to coupler 115 and into reference fiber ring 120 where it circulates around the ring. There is also a portion of light 102 directed to coupler 115 that is directed by coupler 115 to circulator 114 without coupling into reference fiber ring 120. A portion of each optical beam circulating around reference fiber ring 120 is then coupled out. A portion of optical beam 101 propagates out of coupler 115 and into circulator 116 where, along with the portion of light that does not couple into reference fiber ring 120, it is directed to a photo detector 131 comprising part of servo loop 130. Based on the optical signal received at photo detector 131, servo loop 130 generates a feedback signal that controls the frequency of laser source 110 to maintain optical beam 101 locked to a resonant frequency of the reference fiber ring 120. Similarly, a portion of optical beam 102 propagates out of coupler 115 and into circulator 114 where, along with the portion of light that does not couple into reference fiber ring 120, it is directed to a photo detector 151 comprising part of servo loop 150. Based on the optical signal received at photo detector 151, servo loop 150 generates a feedback signal that controls the frequency of laser source 112 to maintain optical beam 102 locked to a resonant frequency of the reference fiber ring 120. Servo loops 130 and 150 are each further described in greater detail below.

In the embodiment shown in FIG. 1, because coupler 115 is the element that couples-in optical beams 101 and 102 into reference fiber ring 120, and also couples-out optical beams 101 and 102 from reference fiber ring 120, the light arriving at photo detectors 131 and 151 will comprise a component of light that has circulated through reference fiber ring 120, and a component of light that has not. For example, when light from optical beam 101 arrives at coupler 115, a first portion (say 10%) is coupled into reference fiber ring 120 while the balance (e.g. 90%) continues out of coupler 115 towards photo detector 131. Similarly, coupler 115 taps a portion (say 10%) of the optical beam 101 recirculating in reference fiber ring 120 out of reference fiber ring 120 while the balance (e.g. 90%) continues to recirculate. Thus, the light arriving at photo detector 131 comprises the optical interference of the component of the optical beam 101 coming directly from laser source 110, and a component of that beam that has been circulating within reference fiber ring 120. When optical beam 101 is on resonance, meaning it has a frequency tuned to a resonance frequency of reference fiber ring 120, these two components will be 180 degrees out-of-phase from each other when optically interfered at coupler 115. As such, the two components destructively interfere with each other to cause a dip in the optical intensity of the light reaching photo detector 131. When the optical intensity reaches a minimum, optical beam 101 is on resonance. The same applies to optical beam 102 and the optical intensity of the light reaching photo detector 151 to determine when optical beam 102 is on resonance. The electrical signals produced by photo detectors 131 and 151 are fed into the servo electronics of respective servo loops 130 and 150 to lock laser sources 110 and 120 to resonant frequencies of reference fiber ring 120.

In this embodiment, photo detectors 131 and 151 are each coupled to what are referred to as reflection ports of reference fiber ring 120. As such, the largest component of the light reaching photo detectors 131 and 151 come directly from the laser sources without propagating first through reference fiber ring 120, though they are modulated by the destructive interference of the light that has that has been circulating within reference fiber ring 120. This means that photo detectors 131 and 151 will quickly detect and react to changes in the light generated by laser sources 110 and 120 so that a very fast control loop may be established for keeping laser sources 110 and 120 tuned to resonant frequencies of reference fiber ring 120.

In one embodiment, servo loops 130 and 150 each implement a Pound-Drever-Hall (PDH) technique servo. For example, as shown in Figure, the electrical signal generated by photo detector 131 is fed into demodulator 139, which demodulates the signal and outputs an error signal into PDH servo 132, which in turn implements the PDH technique to generate a control signal 180 back to laser source 110 to attempt to drive that error signal to a minimum. In the same manner, the electrical signal generated by photo detector 151 is fed into demodulator 159, which demodulates the signal and outputs an error signal into PDH servo 152, which in turn implements the PDH technique to generate a control signal 182 back to laser source 112 to attempt to drive that error signal to a minimum.

In the embodiment shown in FIG. 1, reference fiber ring 120 also functions as an optical filter for all light entering into gyro ring 140. As such, reference fiber ring 120 comprises at least on additional optical coupler 117 that couples a portion of optical beams 101 and 102 out of the reference fiber ring 120 and into gyro fiber ring 140. As with coupler 115, coupler 117 taps a portion (say 10%) of the optical beams 101 and 102 recirculating in reference fiber ring 120 out of reference fiber ring 120 while the balance (e.g. 90%) continues to recirculate. The portion tapped out from each direction or circulation is coupled into gyro ring 140. However, in contrast with the light coupled out from coupler 115 and sent to photo detectors 131 and 151, 100% of the light coupled out from coupler 117 and sent to gyro ring 140 is light that has been circulating around reference fiber ring 120. Reference fiber ring 120 therefore serves as an optical filter, in this embodiment, for gyro ring 140 as further detailed below.

The portion of laser light from optical beam 101 taped out by coupler 117 follows an optical path to gyro ring 140 where it is coupled into gyro ring 140 by a coupler 143 and travels around gyro ring 140 in a first direction (which may correspond to, and be aligned to, the first direction of reference fiber ring 120). The portion of laser light from optical beam 102 tapped out by coupler 117 follows another optical path to gyro ring 140 where it is couple into gyro ring 140 by a coupler 144 and travels around gyro ring 140 in a second direction (which may correspond to, and be aligned to, the second direction of reference fiber ring 120) that is opposite to the first direction.

A portion of each optical beam circulating around gyro ring 140 is then coupled out. A portion of optical beam 101 propagates out of coupler 144 and into circulator 142 where it is directed to a second photo detector 133 comprising part of servo loop 130. Based on the optical signal received at photo detector 133, servo loop 130 further adjusts its feedback signal to control the frequency of laser source 110 to maintain optical beam 101 locked to a resonant frequency of the gyro ring 140. Similarly, a portion of optical beam 102 propagates out of coupler 143 and into circulator 141 where it is directed to a second photo detector 153 comprising part of servo loop 150. Based on the optical signal received at photo detector 153, servo loop 150 further adjusts its feedback signal to control the frequency of laser source 112 to maintain optical beam 102 locked to a resonant frequency of the gyro ring 140.

Generally speaking, laser sources 110 and 112 each launches their respective optical beams at a specific optical frequency f (shown in FIG. 1 as f1 for beam 101 and f2 for beam 102). At that frequency f, the optical beam will exhibit a specific corresponding wavelength, $\lambda$ (which for laser light can be a wavelength on the order of 1.5 microns, for example). When an optical beam is tuned to a frequency f such that exactly an integer multiple of wavelengths $\lambda$ are propagating around a resonator ring (such as rings 120 or 140), then the optical beam is said to be operating at a resonant frequency of that resonator ring. This can also be referred to as operating at one of the resonant modes of the resonator ring. At this frequency, with each pass that the optical beam travels around the loop of the resonator ring, the optical beam is in phase with its previous pass and the optical power from each pass constructively adds and accumulates to a peak resonant intensity within the resonator. Any deviation in the frequency f of the optical beam from a resonance frequency will cause optical power within the resonator ring to sum to less than the peak resonant intensity. When the resonator ring is not undergoing rotation respect to its sensing axis, the various resonance modes for light traveling in the ring's first direction (say the Clockwise (CW) direction) will align in frequency with the various resonance modes for light traveling in the ring's opposing second direction (say the Counter-Clockwise (CCW) direction). However, when the resonator ring is experiencing rotation with respect to its sensing axis, the respective path lengths traveled by light in the CW and CCW directions will no longer be equal, exhibiting a phenomena known as the Sagnac effect. For example, if the resonator ring begins rotating in the CW direction, the distance that optical beam 101 must travel to complete one trip around the ring increases in length, while the distance that optical beam 102 must travel to complete one trip around the ring decreases in length. For a non-zero rotation rate and even the same number of wavelengths (called longitudinal mode number) that fit within the CW and CCW paths, the resonance frequencies associated with each direction will no longer be the same.

With respect to the gyro ring 140, the frequency shift in the resonance frequencies associated with each direction is a function of the rotation rate of gyroscope 100. Rotation rate measurements may therefore be derived by measuring the relative shifts in the resonance frequencies, which in turn may be accomplished by measuring the relative shifts in the frequency of optical beams 101 and 102 which are each locked to a resonant frequency of gyro ring 140 for their respective direction. Accordingly, it is important for servo loops 130 and 150 to also keep optical beams 101 and 102 locked to resonant frequencies of the gyro ring 140.

The challenge faced by servo loops 130 and 150 to keep optical beams 101 and 102 locked to a resonant frequency of the reference fiber ring 120 and also to a resonant frequency of gyro ring 140 is eased by having both rings constructed from the same fiber optic material and wound on hubs constructed of the same material. By having reference fiber ring 120 and gyro ring 140 both constructed from the same fiber optic material and wound on hubs constructed of the same material, shifts in the resonant frequencies of reference fiber ring 120 will naturally track shifts that are occurring in the resonant frequencies of ring 140. These shifts in resonant frequencies can be due to changes in rotation rates, but also due to environmental phenomena such as changes in operating temperatures. That is, because both rings 120 and 140 are similarly constructed of the same material, they are characterized by the same thermal expansion coefficients so that thermal expansion and contraction of the optical path for each ring will change proportionally to each other.

To assist in detecting resonant frequency shifts for both the purpose of rotation rate detection and laser source control, two different modulations are applied by gyroscope 100 to the optical light beams 101 and 102. These are referred to as 1) common modulation (shown at $f_{CM}$) and 2) sideband heterodyne modulation (shown as $f_{SHD}$). Common modulation $f_{CM}$ is applied by piezoelectric transducer 140 to both optical light beams 101 and 102 as they counter-propagate through gyro ring 140. In one implementation, common modulation $f_{CM}$ is applied using a sine wave electrical signal (in the range of about 7 kHZ to 50 kHz, for example) applied to piezoelectric transducer 140 that modulates the resonant frequency of gyro ring 120, producing an known modulation onto the optical beams that facilitates determining when the optical beams are on resonance. Sideband heterodyne (SHD) modulation is applied to each optical beam individually and assist in detecting resonant frequencies in gyro ring 140 in addition to rotation rate detection and rejection of single direction optical backscatter errors. In the embodiment shown in FIG. 1, SHD modulation is applied directly by the laser sources 110 and 112 by modulating the electrical control signals 180 and 182 (discussed below) that control the frequency of the optical beams 101 and 102 produced by laser sources 110 and 112. Control signal 180 is modulated at a frequency of $f_{SHD\_1}$ by summing the control signal with a $f_{SHD\_1}$ modulation signal and applying the result to laser source 110. Control signal 182 is modulated at a frequency of $f_{SHD\_2}$ by summing the control signal with a $f_{SHD\_2}$ modulation signal and applying the result to laser source 112. In other implementations of gyroscope 100, SHD and CM modulation be applied by different means known to those of the art who have studied this disclosure.

Servo loop 130 processes the electrical output from photo detector 133 by demodulating out the $f_{SHD\_1}$ modulation applied to optical beam 101 (using SHD demodulator 134) as well as demodulating the common modulation $f_{CM}$ applied by piezoelectric transducer 148 (using CM demodulator 135). The output of CM demodulator 135 is an error signal that indicates whether optical beam 101 is tuned to a resonance of the gyro ring 140. When the error signal from CM demodulator 135 is equal to zero, the optical beam is on resonance. Gyro Ring (GR) Servo 136 comprises an integrator or digital accumulators that inputs the error signal from CM demodulator 135 and outputs a control signal that is sent to PDH servo 132. As shown in FIG. 1, the control signal output from GR servo 136 is summed with the error signal output from photo detector 131 prior to the PDH servo 132 so that PDH servo 132 controls laser source 110 by generating control signal 180 as a function of both the control signal output from GR servo 136 and the error signal output from photo detector 131. In one implementation, PDH servo 132 attempts to drive their sum to a minimum. Since the resonance frequency of reference fiber ring 120 may not completely align with that of gyro ring 140, the adjustments applied by PDH servo 132 may move optical beam 101 slightly off the resonant frequency of reference fiber ring 120 to move it onto the resonant frequency of gyro ring 140. This is not problematic, however, because the reference fiber ring 120 is designed to have wider resonances than the gyro ring 140. The resonances of the fiber ring 120 are sufficiently wide so that when optical beam 101 is moved slightly off the resonance peak, there is only a minimal loss of optical power within reference fiber ring 120.

In substantially the exact same manner as servo loop 130, servo loop 150 processes the electrical output from photo detector 153 by demodulating out the $f_{SHD\_2}$ modulation applied to optical beam 102 (using SHD demodulator 154) as well as demodulating the common modulation $f_{CM}$ applied by piezoelectric transducer 140 (using CM demodulator 155). The output of CM demodulator 155 is an error signal that indicates whether optical beam 102 is tuned to a resonance of the gyro ring 140. When the error signal from CM demodulator 155 is equal to zero, the optical beam is on resonance. Gyro Ring (GR) Servo 156 comprises an integrator or digital accumulators that inputs the error signal from CM demodulator 155 and outputs a control signal that is sent to PDH servo 152. As shown in FIG. 1, the control signal output from GR servo 156 is summed with the error signal output from photo detector 151 prior to the PDH servo 152 so that PDH servo 152 controls laser source 112 by generating control signal 182 as a function of both the control signal output from GR servo 156 and the error signal output from photo detector 151. In one implementation, PDH servo 152 attempts to drive their sum to a minimum. Since the resonance frequency of reference fiber ring 120 may not completely align with that of gyro ring 140, the adjustments applied by PDH servo 152 may move optical beam 102 slightly off the resonant frequency of reference fiber ring 120 to move it onto the resonant frequency of gyro ring 140. Again, this is not problematic because the reference fiber ring 120 is designed to have wider resonances than the gyro ring 140. The resonances of the fiber ring 120 are sufficiently wide so that when optical beam 102 is moved slightly off the resonance peak, there is only a minimal loss of optical power within reference fiber ring 120.

There may also be circumstances where the resonances of the reference fiber ring 120 and the fiber ring 140 do not overlap very well. This may especially occur due to environmental factors such as temperature changes which can produce temperature gradients across the two resonators. Since a good overlap is desired so that only a minimal loss of optical power occurs when shifting off the reference fiber ring 120 resonant frequency and onto the gyro ring 140 frequency, RFOG 100 may optionally implement another technique which allows some further control of where the resonant frequencies of reference fiber ring 120 are positioned. More specifically, one of the servo loops (in this example, servo loop 150) further includes a reference fiber ring (RFR) servo 157, which feeds off the output of GR servo 156. If the resonant frequency of reference fiber ring 120 were significantly off from the resonant frequency of gyro ring 140, GR servo 156 would generate a large correction signal to PDH servo 152 to attempt to lock optical beam 102 onto the resonant frequency of gyro ring 140. Here, RFR servo 157 also reads that correction signal output from GR servo 156 and applies a voltage onto the piezoelectric transducer 122 of reference fiber ring 120. By controlling the voltage to piezoelectric transducer 122, RFR servo 157 adjusts the resonant frequency of reference fiber ring 120 to attempt to drive the correction signal to zero, which would be an indication that optical beam 102 is substantially locked to both the resonant frequency of reference fiber ring 120 and the resonant frequency of reference fiber ring 140 (further indicating that the respective resonant frequencies where therefore substantially aligned).

Rotation rate measurements are obtained by observing the difference in frequencies between the optical beams 101 and 102. In the particular embodiment of FIG. 1, this is accomplished by developing an optical beat signal by combining optical beams 101 and 102, and observing that beat signal at a photo detector. More specifically, a portion of optical beam 101 is tapped out using coupler 161, and a portion of optical beam 102 is tapped out using coupler 162, and those two portions are optically combined at coupler 163. Difference in frequency between the two beams will be manifested as an optical beat signal in the combined beam that is detected by photo detector 163. Photo detector 163 converts the combined beam comprising the optical beat signal to an electrical signal supplied to beat signal detector 165 (which is also referred to herein as the rotation rate detection circuit). In one embodiment, beat signal detector 165 samples the electrical signal, determines the frequency of a beat signal present in the electrical signal, and calculates a rotation rate which is output as the rotation rate measurement signal 166 for gyroscope 100.

In FIG. 1, the beat signal detection configuration is positioned to tap optical beams 101 and 102 just before they are coupled into gyro ring 140. This position is advantageous because frequency noise and drift errors in indicated rotation rate are less since the measurement is being made close to the gyro resonator 140 in terms of optical path, and thus is the best representation of the true frequency difference of the optical beams 101 and 102 as they enter the gyro resonator 140. However, the optical signals at this point are also more complex having been modulated and processed through ring 120. FIG. 1B illustrates an alternate implementation where the beat signal detection configuration is positioned to receive optical beams 101 and 102 directly from laser sources 110 and 112. Tapping directly from these laser source results in a beat note with a less complex frequency spectrum because the beams are simpler in composition, comprising essentially just the carrier frequency and any SHD modulations (discussed below). Further, at this position, optical beams 101 and 102 immediately react to frequency adjustments applied by servo loop 130 and servo loop 150 in response to shifts in resonant frequencies in rings 120 and 140 due to rotation. Even further, the complexity of the beat signal measurement can be further reduced if the SHD modulations are applied on the light after the couplers 161 and 162 by means of a waveguide phase modulator.

Figure 1A:
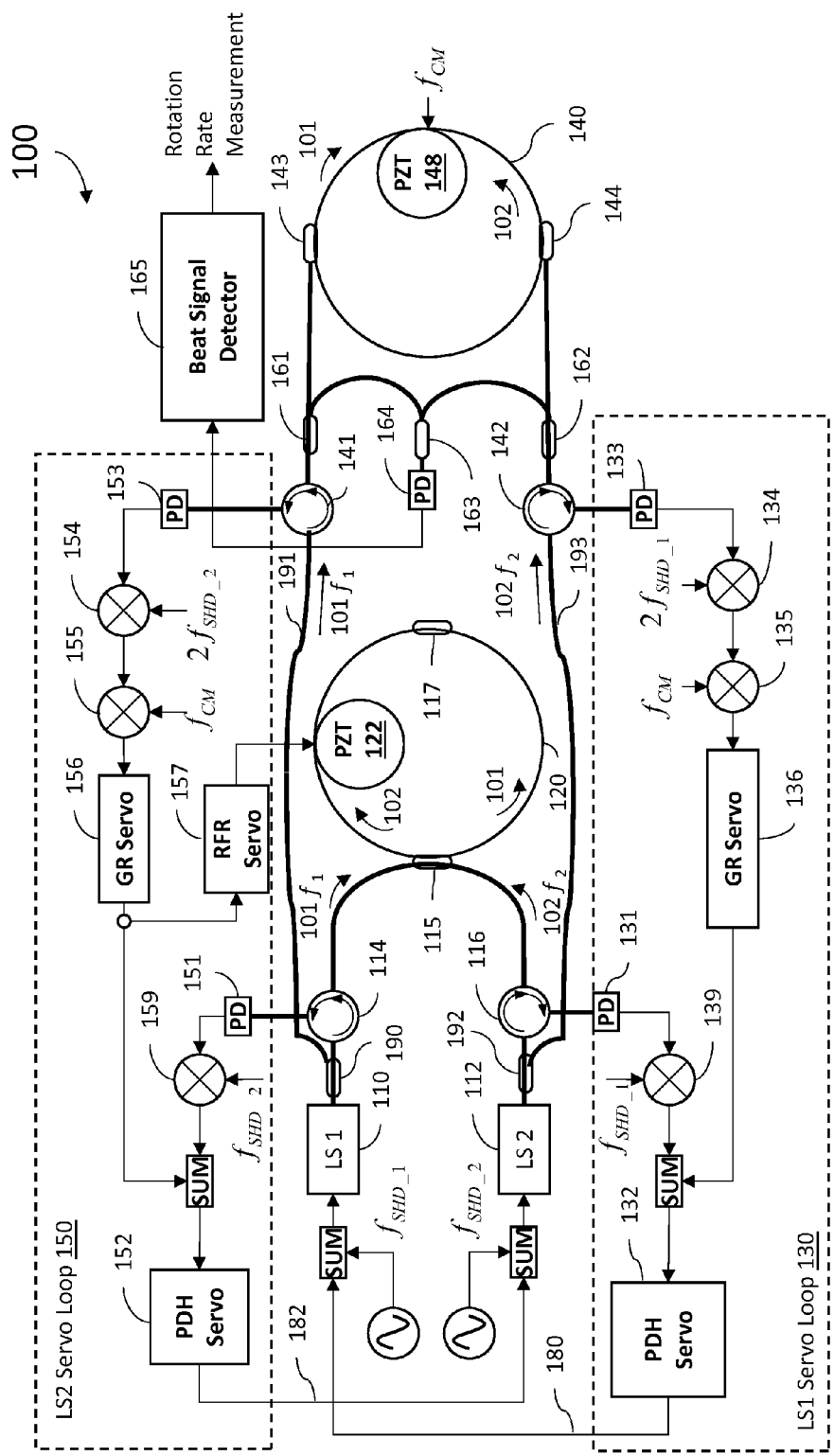
FIG. 1A is a diagram illustrating a gyroscope of one embodiment of the present disclosure.
Figure 1B:
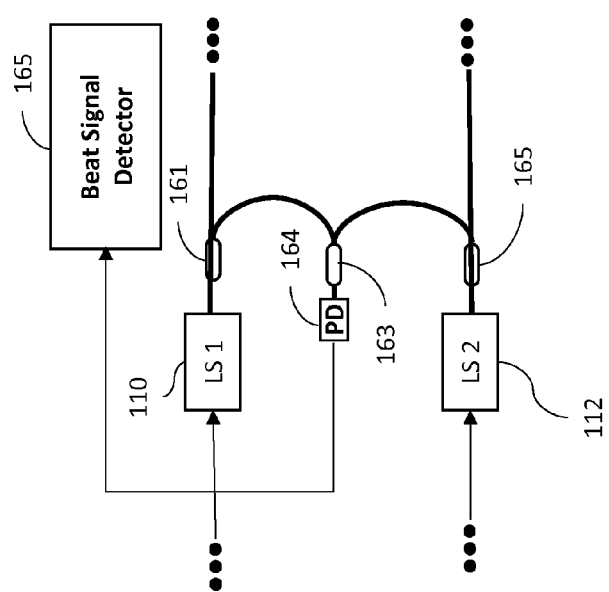
FIG. 1B is a diagram of an alternate beat signal detection configuration of one embodiment of the present disclosure.

FIG. 1A provides an alternate implementation of the gyroscope of FIG. 1 wherein the optical beams 101 and 102 are provided to the both of the two fiber optic ring resonators (i.e., reference fiber ring 120 and gyro fiber ring 140) without implementing an optical filter using reference fiber ring 120. Instead, as shown in FIG. 1A, portions of optical beams 101 and 102 are tapped off at respective couplers 190 and 192 just after they are generated by the laser sources 110 and 112. Waveguide 191 is coupled to coupler 190 and connects optical beam 101 to gyro fiber ring 140 (via circulator 141) where it is coupled into gyro ring 140 and circulates in the first direction. Waveguide 193 is coupled to coupler 192 and connects optical beam 102 to gyro fiber ring 140 (via circulator 142) where it is coupled into gyro ring 140 and circulates in the second direction opposite to the first. Other than the absence of the optical filtering provided by reference fiber ring 120, each of the elements illustrated in FIG. 1A perform the same functions described above with respect to FIG. 1.

With embodiments that implement optical filtering, the length of the resonant fiber ring 120 should be sized at some fraction of the gyro ring 140 to accommodate the pass through of the SHD sidebands modulated onto optical beams 101 and 102. That is, the SHD sidebands should fall within pass bands of the optical filter. If optical filtering is not being implemented, such as in FIG. 1A, the SHD modulated sidebands no longer need to pass through reference fiber ring 120 so that a very short reference fiber ring 120 (e.g. less than 1 meter) can be used. This also provides an increased bandwidth available to the PDH servos, which may provide advantages in some applications needing fast responses.

The SHD modulated side bands will appear in optical beams 101 and 102 next to either side of the laser carrier frequency and are used to determine the resonant frequency for the gyro ring 140. The sidebands need to get through the optical filtering applied by resonant fiber ring 120. In order for the sidebands to get through, they need to line up with a resonance frequency, each of which effectively defines a pass band of the optical filter. To ensure this alignment, the length of the reference fiber ring 120 should be an integer divisor of the length of the gyro ring 140, with that integer ideally being a relatively small number of 4 or less. Further, the shorter the length of the reference fiber ring 120, the larger the SHD frequencies will need to be.

Figure 2:
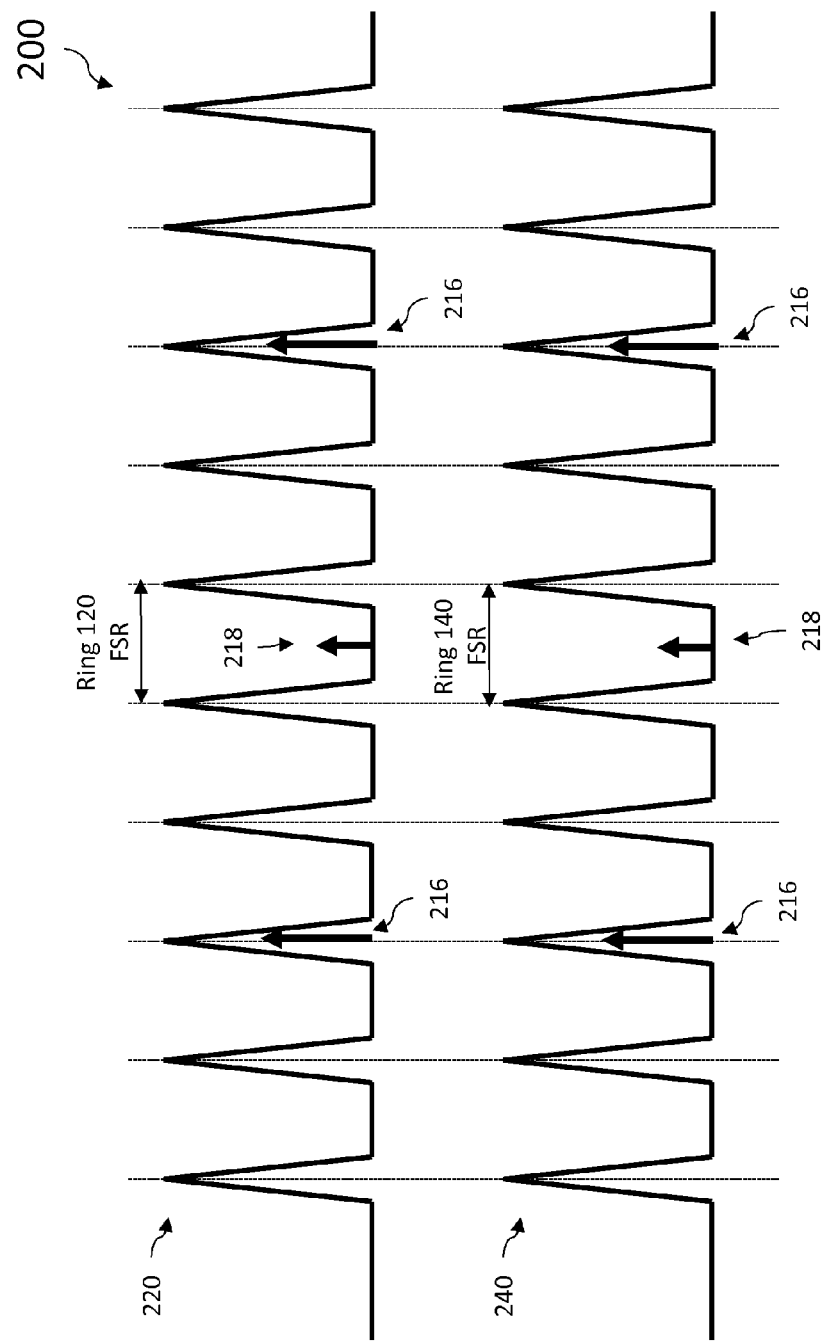
FIG. 2-5 are diagrams illustrating example alignments of resonant frequencies for reference fiber coils and gyro rings.

FIG. 2 provides generally at 200 an illustration showing the relative position of resonance frequencies for reference fiber ring 120 (shown at 220) and gyro ring 140 (shown at 240) along with respect to the carrier frequency of an optical beam (shown at 218) and SHD modulation sidebands (shown at 216) which have been modulated onto the optical beam. For the example of FIG. 2, reference fiber ring 120 and gyro ring 140 each comprise the same length of fiber optic material and therefore share the same free spectral range (FSR). As long as the resonant peaks for reference fiber ring 120 (shown at 220) are well aligned with the resonant peaks for gyro ring 140 (shown at 240) the SHD modulation sidebands 216 will pass through the optical filter. In this example the FSR may be equal to 2 MHz so that each of the sidebands 216 is separated from the carrier 218 by 5 MHz which means $f_{SHD}$ is 5 MHz for this example. It should be noted, however, that only the sidebands 216 will pass through. The carrier 218 does not pass through to gyro ring 240 because it is filtered out by the reference fiber ring 120. This has the advantage of reducing optical power that contributes only to noise but not signal, but has a disadvantage in that it makes it harder to obtain a differential frequency from beat notes.

Figure 3:
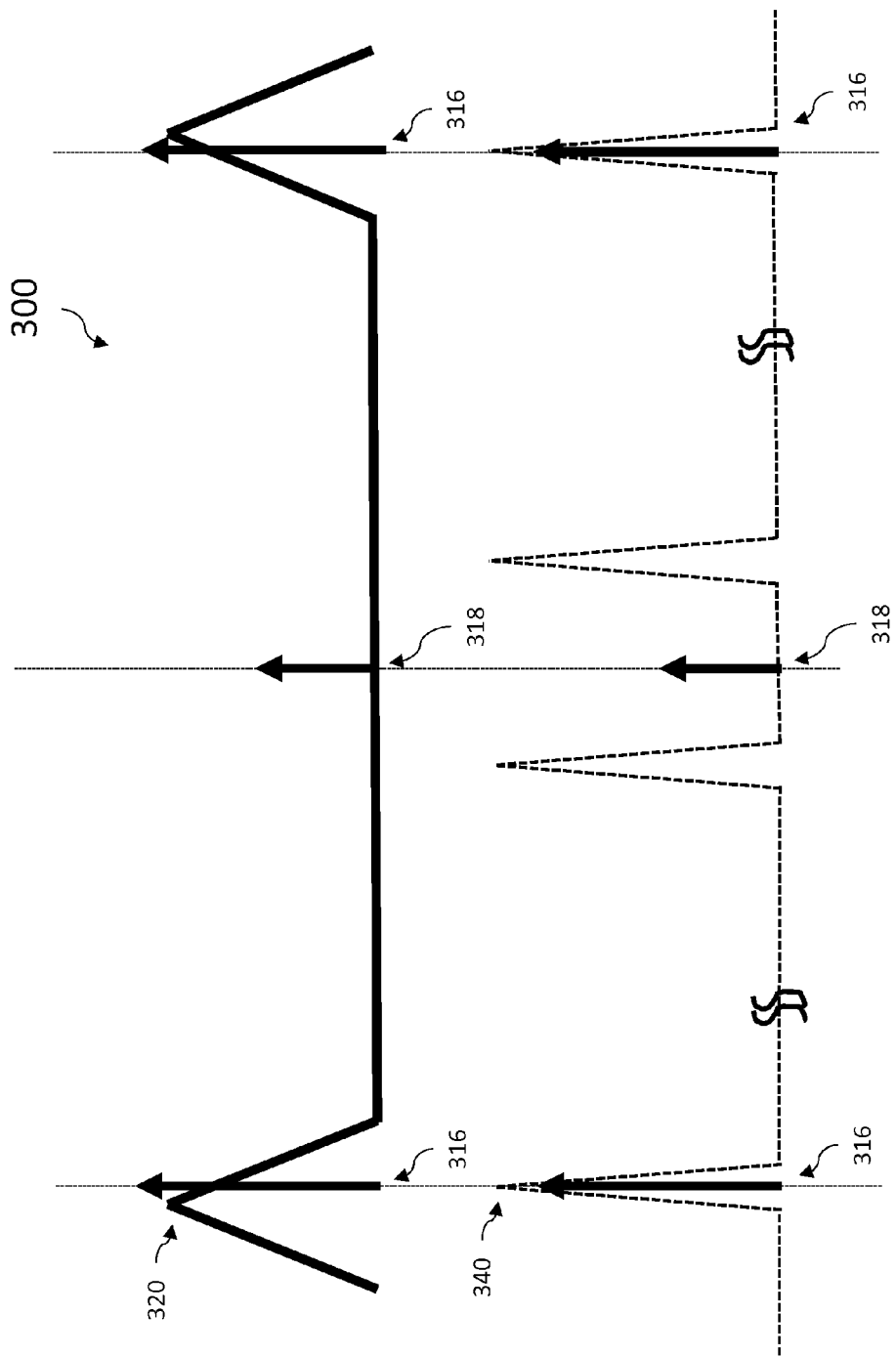

FIG. 3 provides another illustration at 300 showing the relative position of resonance frequencies for reference fiber ring 120 (shown at 320) and gyro ring 140 (shown at 340) along with respect to the carrier frequency of an optical beam (shown at 318) and SHD modulation sidebands (shown at 316) which have been modulated onto the optical beam. For the example of FIG. 3, the gyro ring 140 comprises a longer length of fiber optic material than the reference fiber ring 120. Accordingly gyro ring 140 is characterized as having a relatively smaller FSR than reference fiber ring 120, and resonant peaks (340) that are relatively narrower than the resonant peaks (320) for reference fiber ring 120. What FIG. 3 illustrates is that even though there is misalignment of the resonant peaks 320 and 340, the resonant peaks 320 for reference fiber ring 120 still have sufficient width that the sidebands 316 can pass through the optical filter of reference fiber ring 120 with only limited attenuation. In some implementations, a drop in optical power of sidebands 316 by as much as 20% may still be acceptable. As such, the lengths of optical fiber material used to construct reference fiber ring 120 and gyro ring 140 may be selected accordingly to permit pass through of SHD sidebands applied to the optical beams.

Figure 4:
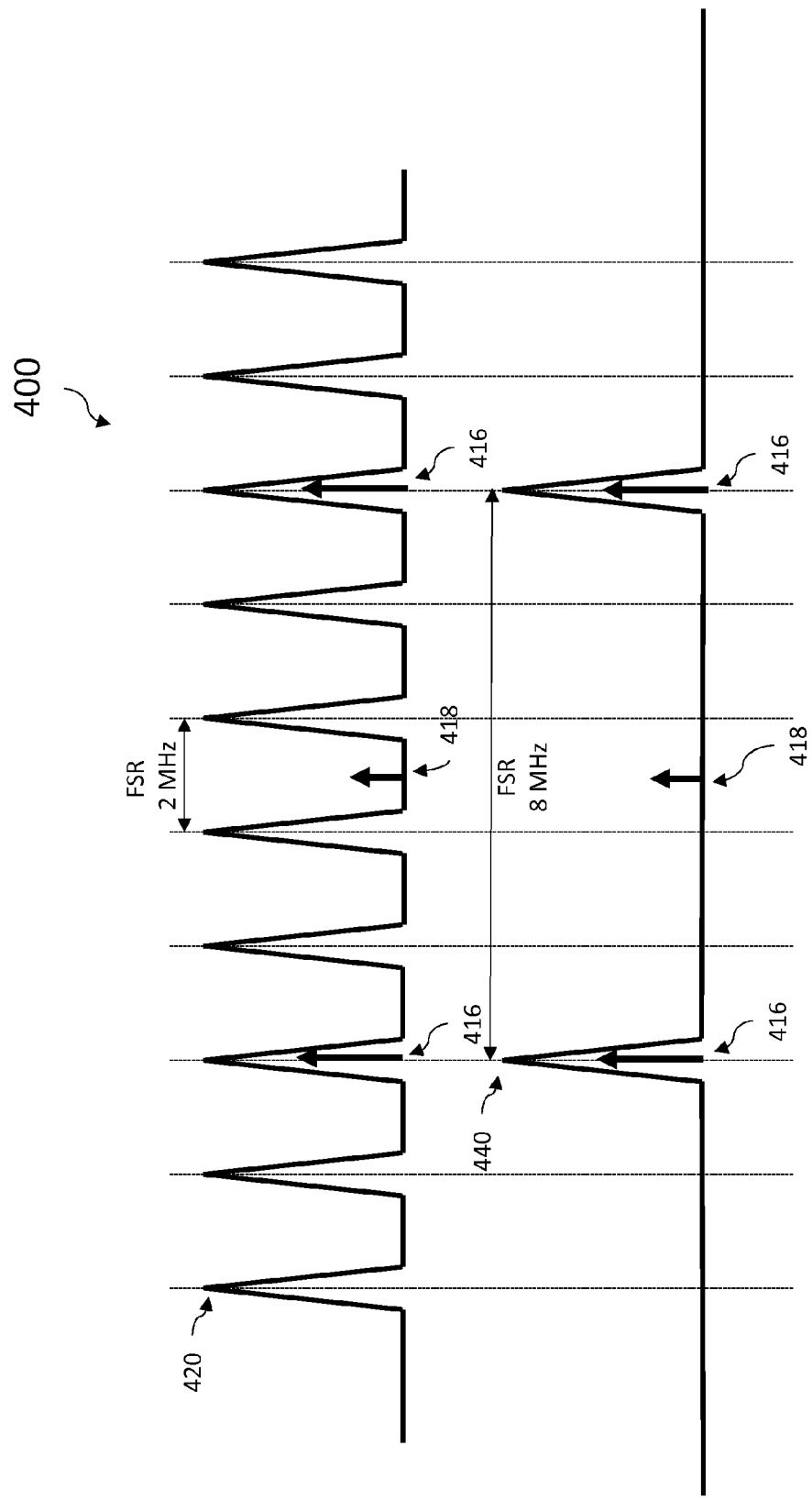

FIG. 4 provides another illustration showing at 400 the relative position of resonance frequencies for reference fiber ring 120 (shown at 440) and gyro ring 140 (shown at 420) with respect to the carrier frequency of an optical beam (shown at 418) and SHD modulation sidebands (shown at 416) which have been modulated onto the optical beam. Here, the reference fiber ring 120 has a length ¼ of the length of gyro ring 140, resulting in a FSR for reference fiber ring 120 that is 4 times that of gyro ring 140. Here, the sidebands 416 will pass through reference fiber ring 120 but the carrier 418 will not.

Figure 5:
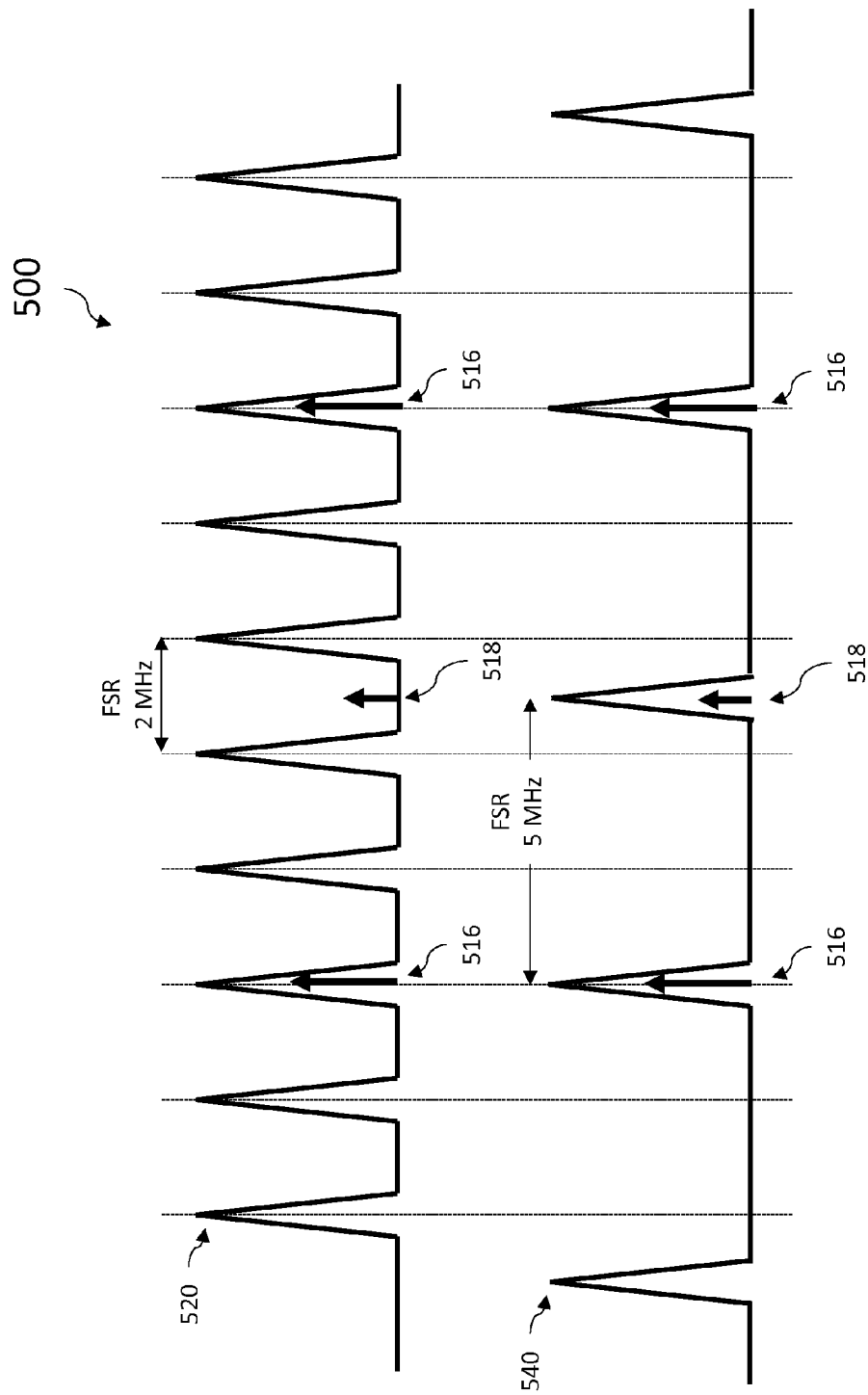

FIG. 5 provides yet another illustration showing at 500 the relative position of resonance frequencies for reference fiber ring 120 and gyro ring 140 along with respect to the carrier frequency of an optical beam (shown at 518) and SHD modulation sidebands 516 which have been modulated onto the optical beam. Here, the reference fiber ring 120 has a length $\frac{2}{5}^{th}$ of the length of gyro ring 140, resulting in a FSR for reference fiber ring 120 that is 5/2 times that of gyro ring 140. Here, the sidebands 516 will pass through reference fiber ring 120 as well as carrier 518.

Figure 6:
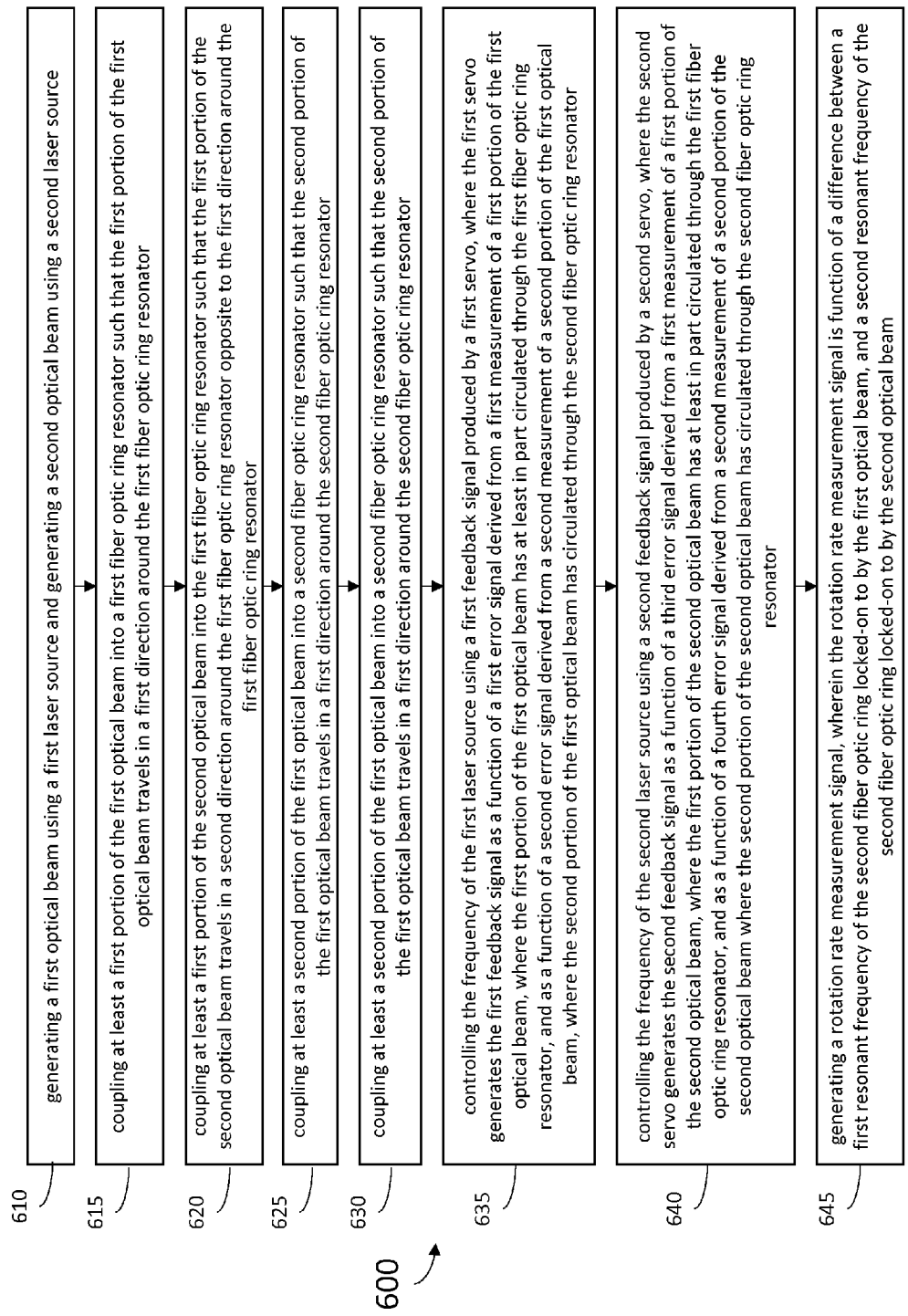
FIG. 6 is a flow chart illustrating a method of one embodiment of the present disclosure.

FIG. 6 is a flow chart illustrating a method 600 of one embodiment of the present disclosure. In various different implementations, method 600 may be used in conjunction with, or in combination with, the embodiments shown in FIGS. 1 and 1A above. As such, descriptions of elements described above apply to those same elements described in method 600, including any optional or alternative implementations, and vice versa.

The method starts at 610 with generating a first optical beam using a first laser source and generating a second optical beam using a second light source. In some embodiments, the first and second laser sources may be controlled to produce an optical spectrum comprising a center carrier and SHD modulated sidebands such as described above. The method proceeds to 615 with coupling at least a first portion of the first optical beam into a first fiber optic ring resonator such that the first portion of the first optical beam travels in a first direction around the first fiber optic ring resonator and to 620 with coupling at least a first portion of the second optical beam into the first fiber optic ring resonator such that the first portion of the second optical beam travels in a second direction around the first fiber optic ring resonator opposite to the first direction around the first fiber optic ring resonator.

The method next proceeds to 625 with coupling at least a second portion of the first optical beam into a second fiber optic ring resonator such that the second portion of the first optical beam travels in a first direction around the second fiber optic ring resonator and to 630 with coupling at least a second portion of the second optical beam into the second fiber optic ring resonator such that the second portion of the second optical beam travels in a second direction around the second fiber optic ring resonator opposite to the first direction around the second fiber optic ring resonator.

The fiber optic materials from which the first and second fiber optic rings are fabricated may comprise either hollow core, solid core, or dielectric filled fiber material, but both rings are constructed from the same fiber optic material, though the length of material used to fabricate each need not be the same. They are also wound around hubs comprising the same hub material. In one embodiment, the two rings are each wound around hub material comprising the same piezoelectric ceramic material, such as (but not limited to) lead zirconate titanate, that is configured as a piezoelectric transducer (such as shown respectively in FIG. 1 as PZT 122 and 140). In some embodiments, the coils may be wound around hubs made of the same composite of materials such as, but not limited to, a combination of ceramic and aluminum or other metal.

The method proceeds to 635 with controlling the frequency of the first laser source using a first feedback signal produced by a first servo, where the first servo generates the first feedback signal as a function of a first error signal derived from a first measurement of a first portion of the first optical beam where the first portion of the first optical beam has at least in part circulated through the first fiber optic ring resonator (i.e., the reference fiber ring), and a second error signal derived from a second measurement of a second portion of the first optical beam where the second portion of the first optical beam has circulated through the second fiber optic ring resonator (i.e., the gyro fiber ring). For example, in FIGS. 1 and 1A, photo detector 131 receives a signal of light from optical beam 101 that includes a component that has circulated through the reference ring 120 and a component that comes straight from laser source 110. Photo detector 133 receives a signal of light from optical beam 101 that has circulated through gyro ring 140. In fact, it only receives light that has circulated entirely through the gyro ring 140. Using these measurements from photo detectors 131 and 133, PDH servo 132 controls the frequency of the first laser source 110 by generating a feedback signal 180 applied to laser source 110.

The method proceeds to 640 with controlling the frequency of the second laser source using a second feedback signal produced by a second servo, where the second servo generates the second feedback signal as a function of a third error signal derived from a first measurement of a first portion of the second optical beam where the first portion of the second optical beam has at least in part circulated through the first fiber optic ring resonator, and a fourth error signal derived from a second measurement of a second portion of the second optical beam where the second portion of the second optical beam has circulated through the second fiber optic ring resonator. For example, in FIGS. 1 and 1A, photo detector 151 receives a signal of light from optical beam 102 that includes a component that has circulated through the reference ring 120 and a component that comes straight from laser source 112. Photo detector 153 receives a signal of light from optical beam 102 that has circulated through gyro ring 140. In fact, it only receives light that has circulated entirely through the gyro ring 140. Using these measurements from photo detectors 151 and 153, PDH servo 152 controls the frequency of the second laser source 112 by generating a feedback signal 182 applied to laser source 112.

The method proceeds to 645 with generating a rotation rate measurement signal, wherein the rotation rate measurement signal is function of a difference between a first resonant frequency of the second fiber optic ring locked-on to by the first optical beam, and a second resonant frequency of the second fiber optic ring locked-on to by the second optical beam. In potential alternate embodiments, at block 645, rotation rate measurements are obtained by observing the difference in frequencies between the two optical beams, which may be accomplished by developing an optical beat signal by combining the first and second optical beams and observing that beat signal at a photo detector. Difference in frequency between the two beams will be manifested as an optical beat signal in the combined beam that is detected by the photo detector, which can convert the combined beam comprising the optical beat signal to an electrical signal. The electrical signal may then be supplied to beat signal detector such as detector 165 described above. In one embodiment, the beat signal detector 165 samples the electrical signal, determines the frequency of a beat signal present in the electrical signal, and calculates a rotation rate which is output as the rotation rate measurement signal for the gyroscope. In alternate embodiments, the beat signal detection configuration is positioned to tap the first and second optical beams just before they are coupled into the gyro ring (such as shown in FIG. 1 or 1A) or alternately positioned to receive the first and second optical beams directly from the first and second laser sources (such as shown in FIG. 1B).

In some embodiment, optically filtering the first optical beam and the second optical beam using the reference fiber coil may be performed before the first optical beam and the second optical beam are coupled into the gyro resonator, such as shown in FIG. 1. In other embodiments, the first optical beam and the second optical beam may be applied to the gyro ring without prior optical filtering by the reference fiber resonator. Further in some embodiment, the method may comprising adjusting a resonant frequency of the reference fiber ring based on the an error signal derived from measurements of one of the optical beams that have circulated through the gyro ring, such as described with respect to the RFR servo 157 and piezoelectric transducers 122 discussed above.

Example Embodiments

Example 1 includes a resonating fiber optic gyroscope, the gyroscope comprising: a first laser light source producing a first optical beam; a second laser light source producing a second optical beam; a first fiber optic ring resonator comprising a first length of a fiber optic material wound around a first hub comprising a hub material, wherein the first optical beam and the second optical beam circulate within the first fiber optic ring resonator in opposite directions; a second fiber optic ring resonator comprising a second length of the fiber optic material wound around a second hub comprising the hub material, wherein the first optical beam and the second optical beam circulate within the second fiber optic ring resonator in opposite directions; a first servo loop coupled to the first fiber optic ring resonator and the second fiber optic ring resonator, wherein the first servo loop controls the first laser light source as a function of a first portion of the first optical beam that has circulated through the first fiber optic ring resonator, and a second portion of the first optical beam that has circulated through the second fiber optic ring resonator; a second servo loop coupled to the first fiber optic ring resonator and the second fiber optic ring resonator, wherein the second servo loop controls the second laser light source as a function of a first portion of the second optical beam that has circulated through the first fiber optic ring resonator, and a second portion of the second optical beam that has circulated through the second fiber optic ring resonator; and a rotation rate detection circuit that outputs a rotation rate measurement as a function of a difference between a first resonant frequency of the second fiber optic ring resonator locked-on to by the first optical beam, and a second resonant frequency of the second fiber optic ring resonator locked-on to by the second optical beam.

Example 2 includes the gyroscope of example 1, wherein the first servo loop comprises: a first photo-detector that receives a light beam comprising a portion of the first optical beam that has circulated through the first fiber optic ring resonator; and a second photo-detector that receives a light beam comprising a portion of the first optical beam that has circulated through the second fiber optic ring resonator; wherein the first servo loop generates a control signal to the first laser light source as a function of a first error signal derived from an output of the first photo-detector and a second error signal derived from an output of the second photo-detector, wherein the first servo loop adjusts the control signal to lock the first optical beam onto a resonant frequency of the first fiber optic ring resonator and resonant frequency of the second fiber optic ring resonator; wherein the second servo loop comprises: a third photo-detector that receives a light beam comprising a portion of the second optical beam that has circulated through the second fiber optic ring resonator; and a fourth photo-detector that receives a light beam comprising a portion of the second optical beam that has circulated through the second fiber optic ring resonator; wherein the second servo loop generates a control signal to the second laser light source as a function of a third error signal derived from an output of the third photo-detector and a fourth error signal derived from an output of the fourth photo-detector, wherein the second servo loop adjusts the control signal to lock the second optical beam onto a resonant frequency of the first fiber optic ring resonator and a resonant frequency of the second fiber optic ring resonator.

Example 3 includes the gyroscope of any of examples 1-2, wherein the second portion of the first optical beam that has circulated through the second fiber optic ring resonator, and the second portion of the second optical beam that has circulated through the second fiber optic ring resonator have each also circulated through the first fiber optic ring resonator prior to circulating through the second fiber optic ring resonator.

Example 4 includes the gyroscope of example 3, wherein the first optical beam and the second optical beam each comprise sideband heterodyne (SHD) modulation; wherein the first length of fiber optic material is sized to produce resonant frequencies in the first fiber optic ring resonator that pass SHD modulated sidebands of the first optical beam and the second optical beam to the second fiber optic ring resonator.

Example 5 includes the gyroscope of example 4, wherein the first length of fiber optic material is further sized to not pass a laser carrier frequency component of the first optical beam and the second optical beam to the second fiber optic ring resonator.

Example 6 includes the gyroscope of any of examples 3-5, further comprising an optical coupler coupled to the first fiber optic ring resonator, wherein the optical coupler taps out a portion of the first optical beam and the second optical beam from the first fiber optic ring resonator to the second optic ring resonator.

Example 7 includes the gyroscope of any of examples 1-6, wherein the fiber optic material is one of: a solid core fiber; a hollow core fiber; or a dielectric filled fiber.

Example 8 includes the gyroscope of any of examples 1-7, wherein the hub material for both the first fiber optic ring resonator and the second fiber optic ring resonator comprises a piezoelectric ceramic material.

Example 9 includes the gyroscope of example 8, wherein the first fiber optic ring resonator comprises a first piezoelectric transducer; wherein the second servo loop comprises a servo coupled to the first piezoelectric transducer; and wherein the servo coupled to the first piezoelectric transducer adjusts a resonant frequency of the first fiber optic ring resonator based on an error signal derived from a measurement of the second portion of the first optical beam that has circulated through the second fiber optic ring resonator.

Example 10 includes the gyroscope of any of examples 1-9, wherein the first servo loop comprises a first Pound-Drever-Hall (PDH) technique servo to generate a first control signal to control the first laser light source lock the first optical beam onto a resonant frequency of the first fiber optic ring resonator and a resonant frequency of the second fiber optic ring resonator; and wherein the second servo loop comprises a second Pound-Drever-Hall (PDH) technique servo to generate a second control signal to control the second laser light source to lock the second optical beam onto a resonant frequency of the first fiber optic ring resonator and resonant frequency of the second fiber optic ring resonator.

Example 11 includes the gyroscope of any of examples 1-10, wherein the first length of fiber optic material is equal to the second length of fiber optic material.

Example 12 includes the gyroscope of any of examples 1-11, wherein the first length of fiber optic material is an integer divisor of the second length of fiber optic material.

Example 13 includes the gyroscope of any of examples 1-12, wherein the rotation rate detection circuit comprises: an optical coupler that mixes a third portion of the first optical beam with a third portion of the second optical beam to generate an optical beat signal; a photo detector coupled to the optical coupler, wherein the photo detector generates an electrical beat signal from the optical beat signal; and a beat signal detector that outputs a rotation rate measurement calculated from the electrical beat signal.

Example 14 includes a method for a resonating fiber optic gyroscope, the method comprising: generating a first optical beam using a first laser source and generating a second optical beam using a second laser source; coupling at least a first portion of the first optical beam into a first fiber optic ring resonator such that the first portion of the first optical beam travels in a first direction around the first fiber optic ring resonator; coupling at least a first portion of the second optical beam into the first fiber optic ring resonator such that the first portion of the second optical beam travels in a second direction around the first fiber optic ring resonator opposite to the first direction around the first fiber optic ring resonator; coupling at least a second portion of the first optical beam into a second fiber optic ring resonator such that the second portion of the first optical beam travels in a first direction around the second fiber optic ring resonator; coupling at least a second portion of the second optical beam into the second fiber optic ring resonator such that the second portion of the second optical beam travels in a second direction around the second fiber optic ring resonator opposite to the first direction around the second fiber optic ring resonator; controlling the frequency of the first laser source using a first feedback signal produced by a first servo, where the first servo generates the first feedback signal as a function of a first error signal derived from a first measurement of a first portion of the first optical beam, where the first portion of the first optical beam has at least in part circulated through the first fiber optic ring resonator, and as a function of a second error signal derived from a second measurement of a second portion of the first optical beam, where the second portion of the first optical beam has circulated through the second fiber optic ring resonator; controlling the frequency of the second laser source using a second feedback signal produced by a second servo, where the second servo generates the second feedback signal as a function of a third error signal derived from a first measurement of a first portion of the second optical beam, where the first portion of the second optical beam has at least in part circulated through the first fiber optic ring resonator, and as a function of a fourth error signal derived from a second measurement of a second portion of the second optical beam where the second portion of the second optical beam has circulated through the second fiber optic ring resonator; and generating a rotation rate measurement signal, wherein the rotation rate measurement signal is function of a difference between a first resonant frequency of the second fiber optic ring resonator locked-on to by the first optical beam, and a second resonant frequency of the second fiber optic ring resonator locked-on to by the second optical beam.

Example 15 includes the method of example 14, wherein the first fiber optic ring resonator comprises a first length of a fiber optic material wound around a first hub comprising a hub material; and wherein the second fiber optic ring resonator comprises a second length of the fiber optic material wound around a second hub comprising the hub material.

Example 16 includes the method of example 15, wherein the first length of fiber optic material is an integer divisor of the second length of fiber optic material.

Example 17 includes the method of any of examples 15-16, wherein the first optical beam and the second optical beam each comprise sideband heterodyne (SHD) modulation; wherein the first length of fiber optic material is sized to produce resonant frequencies in the first fiber optic ring resonator that pass SHD modulated sidebands of the first optical beam and the second optical beam to the second fiber optic ring resonator.

Example 18 includes the method of example 17, wherein the first length of fiber optic material is further sized to not pass a laser carrier frequency component of the first optical beam and the second optical beam to the second fiber optic ring resonator.

Example 19 includes the method of any of examples 15-18, wherein the hub material for both the first fiber optic ring resonator and the second fiber optic ring resonator comprises a piezoelectric ceramic material.

Example 20 includes the method of any of examples 14-19, the method further comprising: adjusting a resonant frequency of the first fiber optic ring resonator based on an error signal derived from a measurement of the second portion of the first optical beam that has circulated through the second fiber optic ring resonator.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A resonating fiber optic gyroscope, the gyroscope comprising:
   a first laser light source producing a first optical beam;
   a second laser light source producing a second optical beam;
   a first fiber optic ring resonator comprising a first length of a fiber optic material wound around a first hub comprising a hub material, wherein the first optical beam and the second optical beam circulate within the first fiber optic ring resonator in opposite directions;
   a second fiber optic ring resonator comprising a second length of the fiber optic material wound around a second hub comprising the hub material, wherein the first optical beam and the second optical beam circulate within the second fiber optic ring resonator in opposite directions;

a first servo loop coupled to the first fiber optic ring resonator and the second fiber optic ring resonator, wherein the first servo loop controls the first laser light source using a first feedback signal, where the first servo loop generates the first feedback signal as a function of a first error signal derived from a first measurement of a first portion of the first optical beam, where the first portion of the first optical beam has at least in part circulated through the first fiber optic ring resonator, and as a function of a second error signal derived from a second measurement of a second portion of the first optical beam, where the second portion of the first optical beam has circulated through the second fiber optic ring resonator;

a second servo loop coupled to the first fiber optic ring resonator and the second fiber optic ring resonator, wherein the second servo loop controls the second laser light source using a second feedback signal, where the second servo loop generates the second feedback signal as a function of a third error signal derived from a first measurement of a first portion of the second optical beam, where the first portion of the second optical beam has at least in part circulated through the first fiber optic ring resonator, and as a function of a fourth error signal derived from a second measurement of a second portion of the second optical beam where the second portion of the second optical beam has circulated through the second fiber optic ring resonator; and a rotation rate detection circuit that outputs a rotation rate measurement signal, wherein the rotation rate measurement signal is function of a difference between a first resonant frequency of the second fiber optic ring resonator locked-on to by the first optical beam, and a second resonant frequency of the second fiber optic ring resonator locked-on to by the second optical beam.

2. The gyroscope of claim 1, wherein the first servo loop comprises:

a first photo-detector that receives a light beam comprising a portion of the first optical beam that has circulated through the first fiber optic ring resonator; and a second photo-detector that receives a light beam comprising a portion of the first optical beam that has circulated through the second fiber optic ring resonator;

wherein the first servo loop generates a control signal to the first laser light source as a function of a first error signal derived from an output of the first photo-detector and a second error signal derived from an output of the second photo-detector, wherein the first servo loop adjusts the control signal to lock the first optical beam onto a resonant frequency of the first fiber optic ring resonator and resonant frequency of the second fiber optic ring resonator;

wherein the second servo loop comprises:

a third photo-detector that receives a light beam comprising a portion of the second optical beam that has circulated through the second fiber optic ring resonator; and a fourth photo-detector that receives a light beam comprising a portion of the second optical beam that has circulated through the second fiber optic ring resonator;

wherein the second servo loop generates a control signal to the second laser light source as a function of a third error signal derived from an output of the third photo-detector and a fourth error signal derived from an output of the fourth photo-detector, wherein the second servo loop adjusts the control signal to lock the second optical beam onto a resonant frequency of the first fiber optic ring resonator and a resonant frequency of the second fiber optic ring resonator.

3. The gyroscope of claim 1, wherein the second portion of the first optical beam that has circulated through the second fiber optic ring resonator, and the second portion of the second optical beam that has circulated through the second fiber optic ring resonator have each also circulated through the first fiber optic ring resonator prior to circulating through the second fiber optic ring resonator.

4. The gyroscope of claim 3, wherein the first optical beam and the second optical beam each comprise sideband heterodyne (SHD) modulation;

wherein the first length of fiber optic material is sized to produce resonant frequencies in the first fiber optic ring resonator that pass SHD modulated sidebands of the first optical beam and the second optical beam to the second fiber optic ring resonator.

5. The gyroscope of claim 4, wherein the first length of fiber optic material is further sized to not pass a laser carrier frequency component of the first optical beam and the second optical beam to the second fiber optic ring resonator.

6. The gyroscope of claim 3, further comprising an optical coupler coupled to the first fiber optic ring resonator, wherein the optical coupler taps out a portion of the first optical beam and the second optical beam from the first fiber optic ring resonator to the second optic ring resonator.

7. The gyroscope of claim 1, wherein the fiber optic material is one of:

a solid core fiber;

a hollow core fiber; or a dielectric filled fiber.

8. The gyroscope of claim 1, wherein the hub material for both the first fiber optic ring resonator and the second fiber optic ring resonator comprises a piezoelectric ceramic material.

9. The gyroscope of claim 8, wherein the first fiber optic ring resonator comprises a first piezoelectric transducer;

wherein the second servo loop comprises a servo coupled to the first piezoelectric transducer; and wherein the servo coupled to the first piezoelectric transducer adjusts a resonant frequency of the first fiber optic ring resonator based on an error signal derived from a measurement of the second portion of the first optical beam that has circulated through the second fiber optic ring resonator.

10. The gyroscope of claim 1, wherein the first servo loop comprises a first Pound-Drever-Hall (PDH) technique servo to generate a first control signal to control the first laser light source lock the first optical beam onto a resonant frequency of the first fiber optic ring resonator and a resonant frequency of the second fiber optic ring resonator; and wherein the second servo loop comprises a second Pound-Drever-Hall (PDH) technique servo to generate a second control signal to control the second laser light source to lock the second optical beam onto a resonant frequency of the first fiber optic ring resonator and resonant frequency of the second fiber optic ring resonator.

11. The gyroscope of claim 1, wherein the first length of fiber optic material is equal to the second length of fiber optic material.

12. The gyroscope of claim 1, wherein the first length of fiber optic material is an integer divisor of the second length of fiber optic material.

13. The gyroscope of claim 1, wherein the rotation rate detection circuit comprises:
   an optical coupler that mixes a third portion of the first optical beam with a third portion of the second optical beam to generate an optical beat signal;
   a photo detector coupled to the optical coupler, wherein the photo detector generates an electrical beat signal from the optical beat signal; and
   a beat signal detector that outputs a rotation rate measurement calculated from the electrical beat signal.

14. A method for a resonating fiber optic gyroscope, the method comprising:
   generating a first optical beam using a first laser source and generating a second optical beam using a second laser source;
   coupling at least a first portion of the first optical beam into a first fiber optic ring resonator such that the first portion of the first optical beam travels in a first direction around the first fiber optic ring resonator;
   coupling at least a first portion of the second optical beam into the first fiber optic ring resonator such that the first portion of the second optical beam travels in a second direction around the first fiber optic ring resonator opposite to the first direction around the first fiber optic ring resonator;
   coupling at least a second portion of the first optical beam into a second fiber optic ring resonator such that the second portion of the first optical beam travels in a first direction around the second fiber optic ring resonator;
   coupling at least a second portion of the second optical beam into the second fiber optic ring resonator such that the second portion of the second optical beam travels in a second direction around the second fiber optic ring resonator opposite to the first direction around the second fiber optic ring resonator;
   controlling the frequency of the first laser source using a first feedback signal produced by a first servo, where the first servo generates the first feedback signal as a function of a first error signal derived from a first measurement of a first portion of the first optical beam, where the first portion of the first optical beam has at least in part circulated through the first fiber optic ring resonator, and as a function of a second error signal derived from a second measurement of a second portion of the first optical beam, where the second portion of the first optical beam has circulated through the second fiber optic ring resonator;
   controlling the frequency of the second laser source using a second feedback signal produced by a second servo, where the second servo generates the second feedback signal as a function of a third error signal derived from a first measurement of a first portion of the second optical beam, where the first portion of the second optical beam has at least in part circulated through the first fiber optic ring resonator, and as a function of a fourth error signal derived from a second measurement of a second portion of the second optical beam where the second portion of the second optical beam has circulated through the second fiber optic ring resonator; and
   generating a rotation rate measurement signal, wherein the rotation rate measurement signal is function of a difference between a first resonant frequency of the second fiber optic ring resonator locked-on to by the first optical beam, and a second resonant frequency of the second fiber optic ring resonator locked-on to by the second optical beam.

15. The method of claim 14, wherein the first fiber optic ring resonator comprises a first length of a fiber optic material wound around a first hub comprising a hub material; and
   wherein the second fiber optic ring resonator comprises a second length of the fiber optic material wound around a second hub comprising the hub material.

16. The method of claim 15, wherein the first length of fiber optic material is an integer divisor of the second length of fiber optic material.

17. The method of claim 15, wherein the first optical beam and the second optical beam each comprise sideband heterodyne (SHD) modulation;
   wherein the first length of fiber optic material is sized to produce resonant frequencies in the first fiber optic ring resonator that pass SHD modulated sidebands of the first optical beam and the second optical beam to the second fiber optic ring resonator.

18. The method of claim 17, wherein the first length of fiber optic material is further sized to not pass a laser carrier frequency component of the first optical beam and the second optical beam to the second fiber optic ring resonator.

19. The method of claim 15, wherein the hub material for both the first fiber optic ring resonator and the second fiber optic ring resonator comprises a piezoelectric ceramic material.

20. The method of claim 14, the method further comprising:
   adjusting a resonant frequency of the first fiber optic ring resonator based on an error signal derived from a measurement of the second portion of the first optical beam that has circulated through the second fiber optic ring resonator.

* * * * *